United States Patent
Li et al.

(10) Patent No.: US 7,206,470 B2
(45) Date of Patent: Apr. 17, 2007

(54) PLANAR LIGHTWAVE CIRCUIT WAVEGUIDE BENDS AND BEAMSPLITTERS

(75) Inventors: Lixia Li, Madison, AL (US); Gregory P. Nordin, Huntsville, AL (US); Jianhua Jiang, Madison, AL (US); Jennifer M. English, Madison, AL (US)

(73) Assignee: University of Alabama in Huntsville, Huntsville, AL (US)

( * ) Notice: Subject to any disclaimer, the term of this patent is extended or adjusted under 35 U.S.C. 154(b) by 0 days.

(21) Appl. No.: 10/973,068

(22) Filed: Oct. 25, 2004

(65) Prior Publication Data

US 2005/0152633 A1   Jul. 14, 2005

Related U.S. Application Data

(60) Provisional application No. 60/514,030, filed on Oct. 24, 2003.

(51) Int. Cl.
G02B 6/12 (2006.01)
G02B 6/26 (2006.01)
G02B 6/42 (2006.01)

(52) U.S. Cl. .......................................... 385/14; 385/39
(58) Field of Classification Search ................. 385/14, 385/16–18, 32, 47, 129–132
See application file for complete search history.

(56) References Cited

U.S. PATENT DOCUMENTS

| 4,957,347 A | 9/1990 | Zarian |
| 5,334,941 A | 8/1994 | King |
| 6,236,797 B1 | 5/2001 | Hotta et al. |
| 6,356,679 B1 * | 3/2002 | Kapany ....................... 385/18 |
| 6,621,972 B2 * | 9/2003 | Kimerling et al. .......... 385/132 |
| 6,901,194 B2 * | 5/2005 | Charlton et al. ............ 385/122 |
| 6,915,029 B2 * | 7/2005 | Lee et al. ..................... 385/14 |
| 2002/0012512 A1 | 1/2002 | Elrefaie et al. |
| 2002/0048422 A1 * | 4/2002 | Cotteverte et al. ............. 385/4 |
| 2002/0122644 A1 | 9/2002 | Birks et al. |
| 2002/0122648 A1 | 9/2002 | Mule' et al. |

(Continued)

FOREIGN PATENT DOCUMENTS

GB   WO 98/53351 A2 * 11/1998
JP   57 207204    12/1982

OTHER PUBLICATIONS

R.L. Espinola et al., *A Study of High-Index-Contrast 90° Waveguide Bend Structures*, Optics Express, vol. 8, No. 9, pp. 517-528, Apr. 23, 2001.

(Continued)

*Primary Examiner*—Michelle Connelly-Cushwa
*Assistant Examiner*—Chris H. Chu
(74) *Attorney, Agent, or Firm*—Alston & Bird LLP

(57) ABSTRACT

A planar lightwave circuit has a waveguide having a bend and plurality of multiple trenches with parallel front and back interfaces. The trench and waveguide refractive indexes are different such that a refractive interface is defined between the waveguide and the trench. The trench may include a material of higher refractive index than the waveguide, such as silicon, or alternatively a material having a lower refractive index than the waveguide, such as an air void. The trench is disposed on the waveguide bend such that the front and back planar interfaces have an angle of incidence to a direction of the lightwave propagation from the waveguide. The invention also includes beamsplitters that include trenches that reflect a portion of a lightwave in a first direction and a portion of a lightwave in a second direction.

26 Claims, 13 Drawing Sheets

U.S. PATENT DOCUMENTS

| | | |
|---|---|---|
| 2003/0026584 A1 | 2/2003 | Ingman et al. |
| 2003/0035631 A1 | 2/2003 | Eggleton et al. |
| 2004/0033020 A1* | 2/2004 | LoCascio et al. ............. 385/37 |
| 2004/0208465 A1* | 10/2004 | Logvin et al. .............. 385/129 |
| 2004/0213536 A1* | 10/2004 | Zoorob et al. .............. 385/131 |

OTHER PUBLICATIONS

Li et al., *Small-Area Bends and Beamsplitters for Low-Index-Contrast Waveguides*, Optics Express, vol. 11, No. 3, pp. 282-290, Feb. 10, 2003.

Syms et al., Optical Guided Waves and Devices, pp. 229-231, 1992, no month.

Wada et al., *Micron-Size Bending Radii in Silica-Based Waveguides*, pp. 13-14, no date.

Jiang et al., *A Rigorous Unidirectional Method for Designing Finite Aperture Diffractive Optical Elements*, Optics Express, vol. 7, No. 6, pp. 237-242, Sep. 11, 2000.

Popović et al., *Air Trenches for Sharp Silica Waveguide Bends*, Journal of Lightwave Technology, vol. 20, No. 9, pp. 1762-1772, Sep. 2002.

* cited by examiner

PLANAR LIGHTWAVE CIRCUIT WAVEGUIDE BENDS AND BEAMSPLITTERS

CROSS-REFERENCE TO RELATED APPLICATIONS

This application claims the benefit of the filing date of U.S. Provisional Patent Application Ser. No. 60/514,030 filed Oct. 24, 2003, which is hereby incorporated by reference.

FEDERALLY SPONSORED RESEARCH OR DEVELOPMENT

The research underlying this invention was supported in part with funds from DARPA grant no. N66001-01-1-8938 and National Science Foundation grant EPS-0091853. The United States Government may have an interest in the subject matter of this invention.

FIELD OF THE INVENTION

The invention relates to planar lightwave circuits, and more particularly, to planar lightwave circuit waveguide bends and beamsplitters having multiple planar interfaces.

BACKGROUND OF THE INVENTION

Reducing the size of waveguide components enables higher levels of integration in planar lightwave circuits (PLCs). Waveguide bends and splitters heavily influence overall component size. Low refractive index contrast waveguides in low index materials such as silica typically have a minimum bend radius of millimeters to several centimeters, which limits device size reduction. In one approach to reduce the size of components, those of ordinary skill in the art use waveguides with high refractive index contrast such that the minimum bend radius is much smaller. Examples for the 1.3 µm and 1.5 µm wavelength regions include core materials with large refractive index such as Si or poly-Si embedded in a low index cladding of $SiO_2$. High refractive index contrast in such systems permits total internal reflection (TIR) to confine light to the waveguide even when the bend radius is reduced to the order of a few microns. Ninety degree bends can be decreased still further in size through the use of resonant cavities or corner mirrors. However, for a given level of interface roughness between the core and clad materials, high refractive index contrast waveguides give rise to more scattering loss than those with low refractive index contrast. Due to scattering loss, PLCs based on high index contrast waveguides may limit device scale integration.

An alternate approach is to use materials with a large refractive index in configurations that permit low refractive index contrast, however, these circuits have weak optical confinement. Examples include SiGe on Si, and SOI ridge waveguides. In such cases vertically etched faces can be used as mirrors to realize sharp waveguide bends. Alternatively, an isolation trench on the outside edge of the bend can be used in conjunction with an offset between the bend waveguide segment and the straight input and output segments to dramatically reduce the bend radius.

Most commercially available PLCs are based on very low loss silica waveguides, which have a low refractive index as well as low refractive index contrast between the core and clad. Moreover, polymer waveguides, which typically have similar low refractive index and low index contrast, continue to receive attention as a potential candidate for PLCs. One proposed solution for silica materials is to etch regions that define a high index contrast bend with tapers on both ends to couple light into and out of the bend region. Overall sizes of such structures are expected to be on the order of 100 µm or greater.

BRIEF SUMMARY OF THE INVENTION

According to one embodiment of the invention, a planar lightwave circuit comprises a waveguide having a bend through which the waveguide direction is changed, in one embodiment as much as 90°. A plurality of trenches having parallel front and back interfaces are disposed on the bend. The trench has a refractive index different than the first refractive index so as to create a refractive interface between the waveguide and the trench. In some embodiments, the trench comprises a material of higher refractive index than the waveguide, such as silicon. In other embodiments, the trench comprises a material having a lower refractive index than the waveguide, such as an air void. The trench is disposed on the waveguide bend such that the front and back planar interfaces have an angle of incidence to a direction of the lightwave propagation from the waveguide. As such, the trench interfaces reflect at least a portion of the lightwave through the bend.

The amount of light reflected by the front and back interfaces is dependent upon the distance between the interfaces and relative to the waveguide. In some embodiments the distances are asymmetric and may be determined by an algorithm that maximizes the portion of the lightwave reflecting through the waveguide bend. In other embodiments, the distances may be periodic with respect to a phase angle of the lightwave. Again, an algorithm may be used to adjust the thickness of the trenches in order to maximize the portion of the lightwave reflecting through the waveguide bend.

According to another embodiment of the invention, a planar lightwave circuit beamsplitter comprises a waveguide having a split in first and second directions. A plurality of trenches comprising parallel front and back planar interfaces are disposed in the split. Similar to the above embodiments, the trench interfaces reflect a portion of the lightwave through one direction of the split, and permit transmission of a portion of the lightwave through to the second direction of the split. Like the above embodiments, the reflection and transmission are dependent upon the distance between the interfaces. The distance may be defined by an algorithm that optimizes the portion of the lightwave reflecting in the first direction relative to the portion of lightwave transmission in the second direction.

In one embodiment, a planar light wave circuit beamsplitter comprises a polarization beamsplitter. In this embodiment, the trenches are disposed on the waveguide split at the Brewster angle, which is the angle at which the lightwave transmits through the interface and substantially little light is reflected. The Brewster angle is, however, dependent upon the polarization of the light, and therefore, only a particular polarized light is transmitted therethrough, while oppositely polarized light is reflected.

BRIEF DESCRIPTION OF THE SEVERAL VIEWS OF THE DRAWINGS

Figure 1:
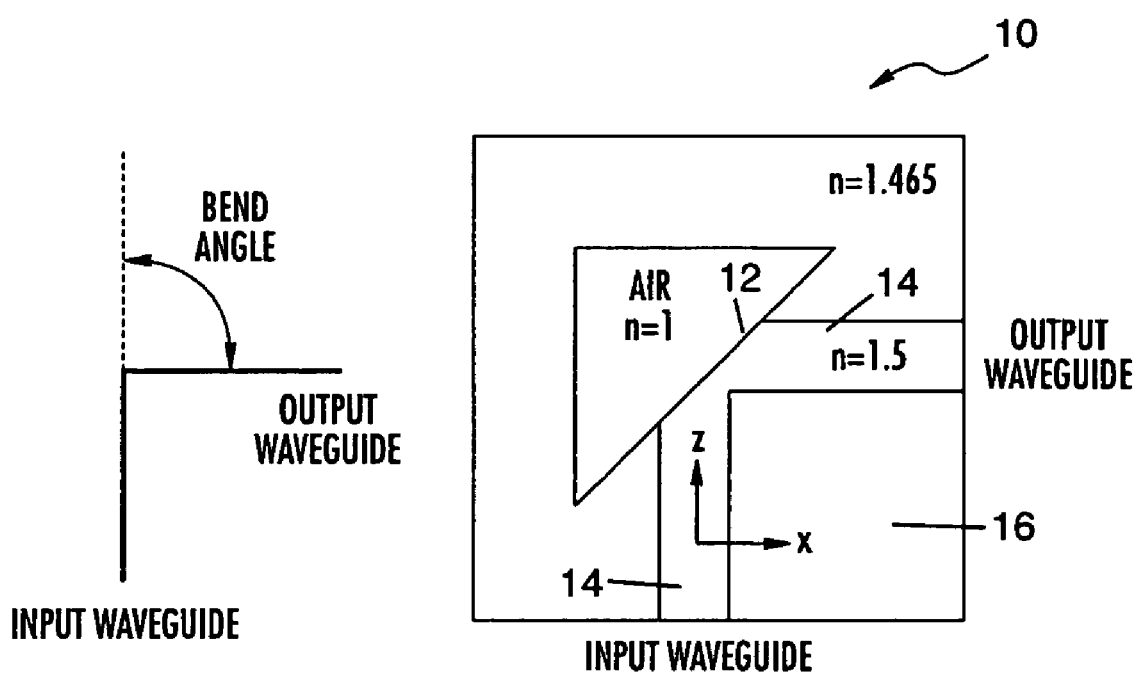
Figure 2:
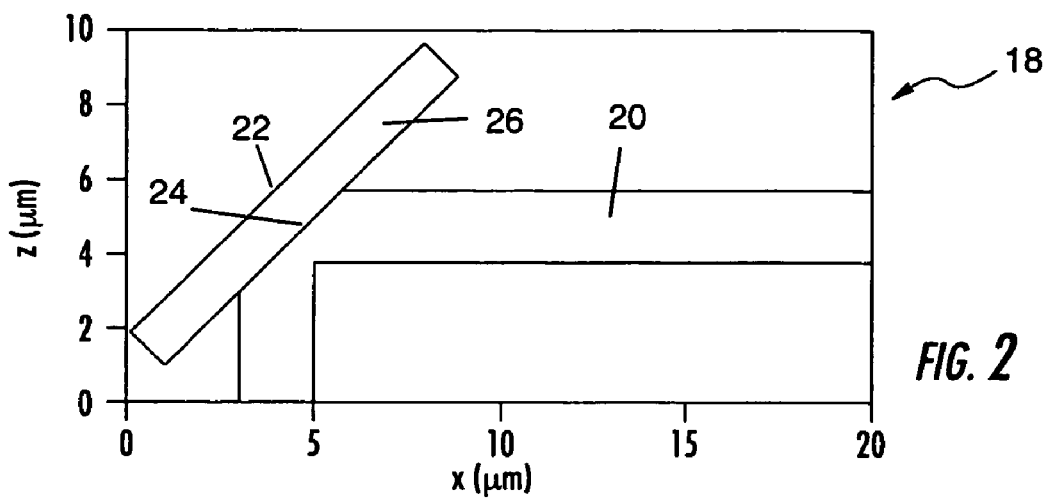
Figure 3:
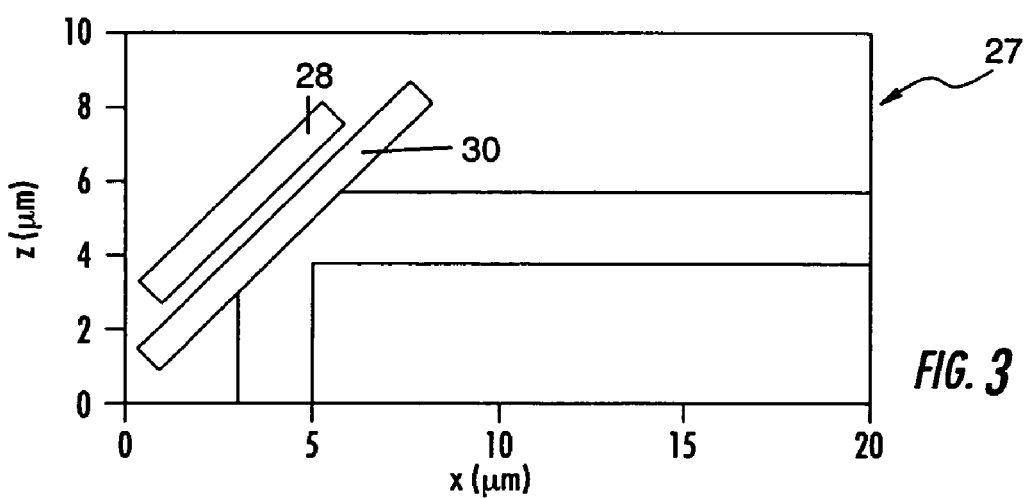
Figure 4:
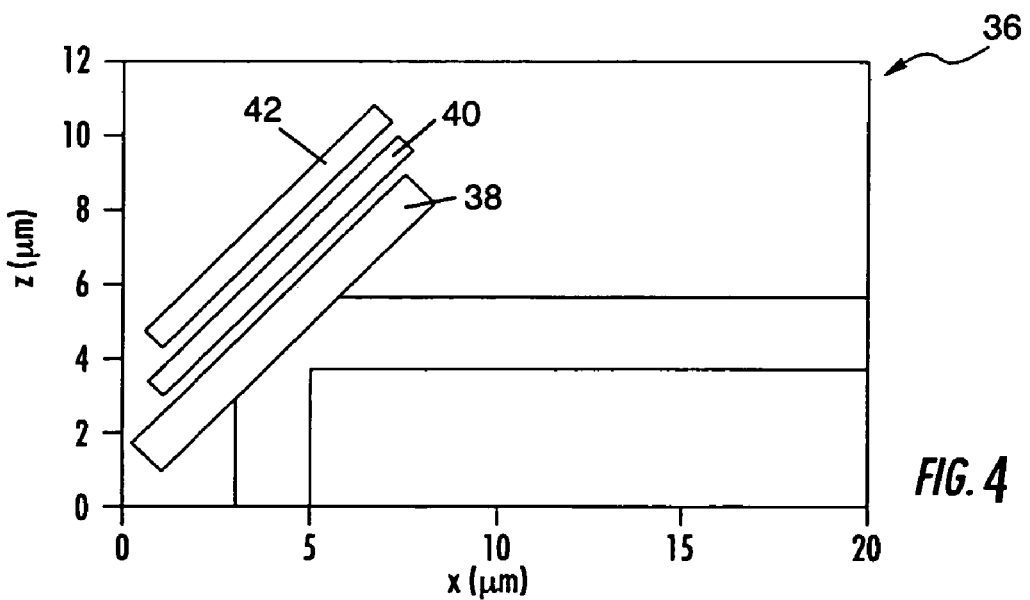
Figure 5:
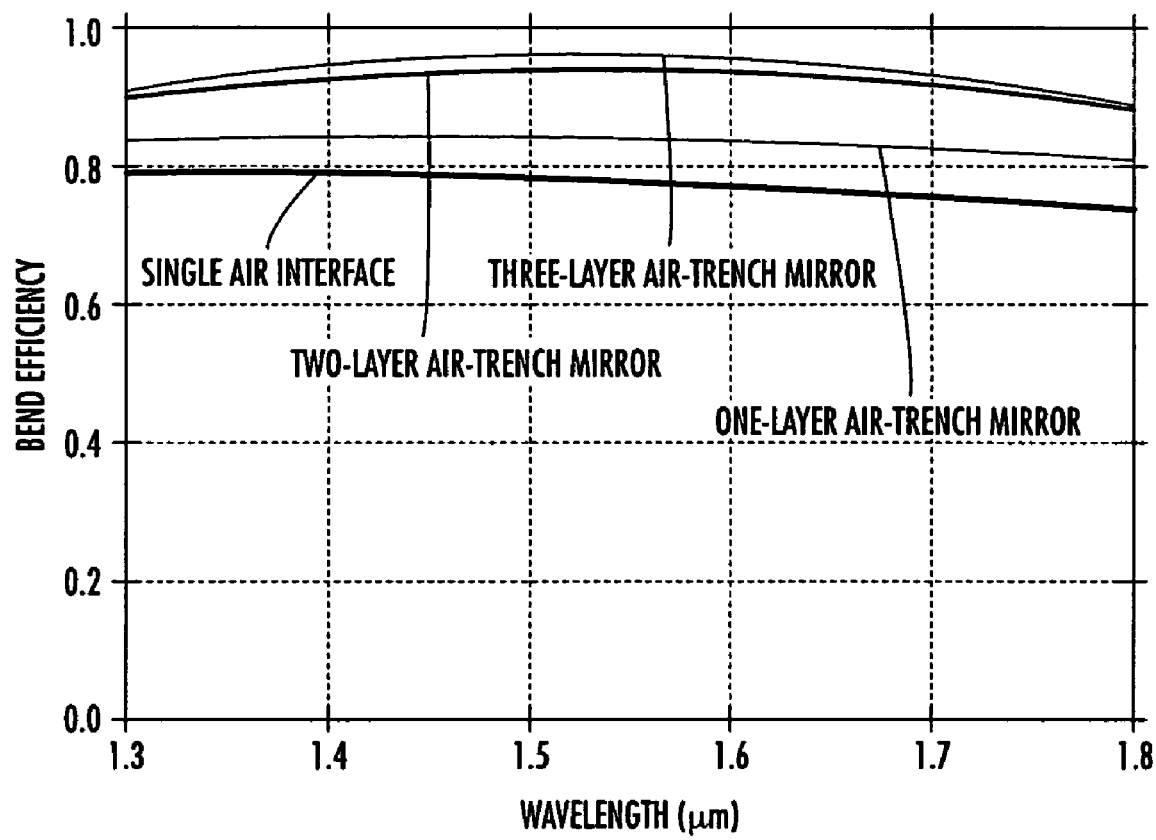
Figure 6:
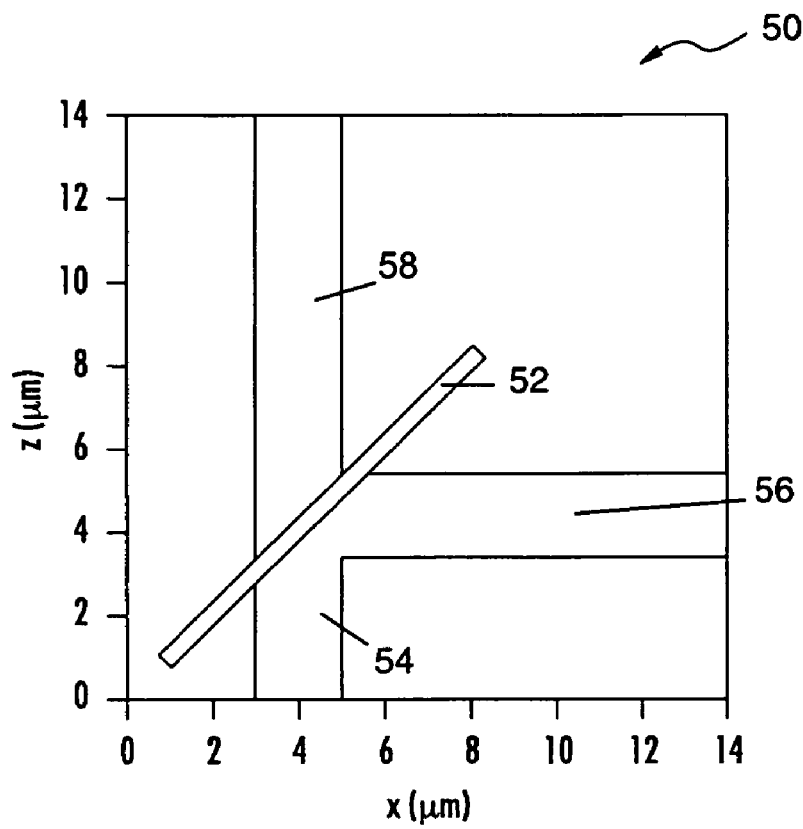
Figure 7:
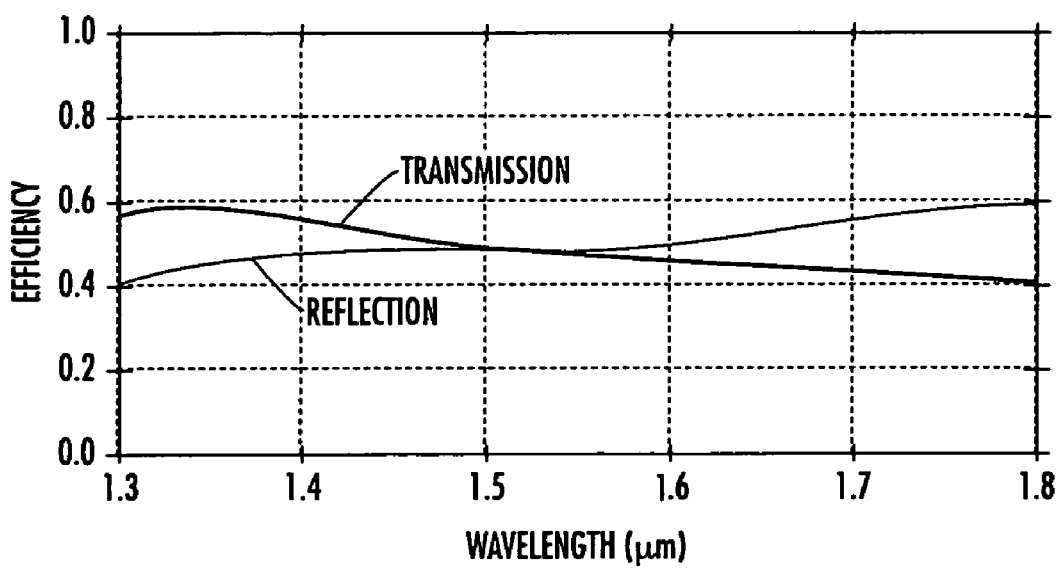
Figure 8:
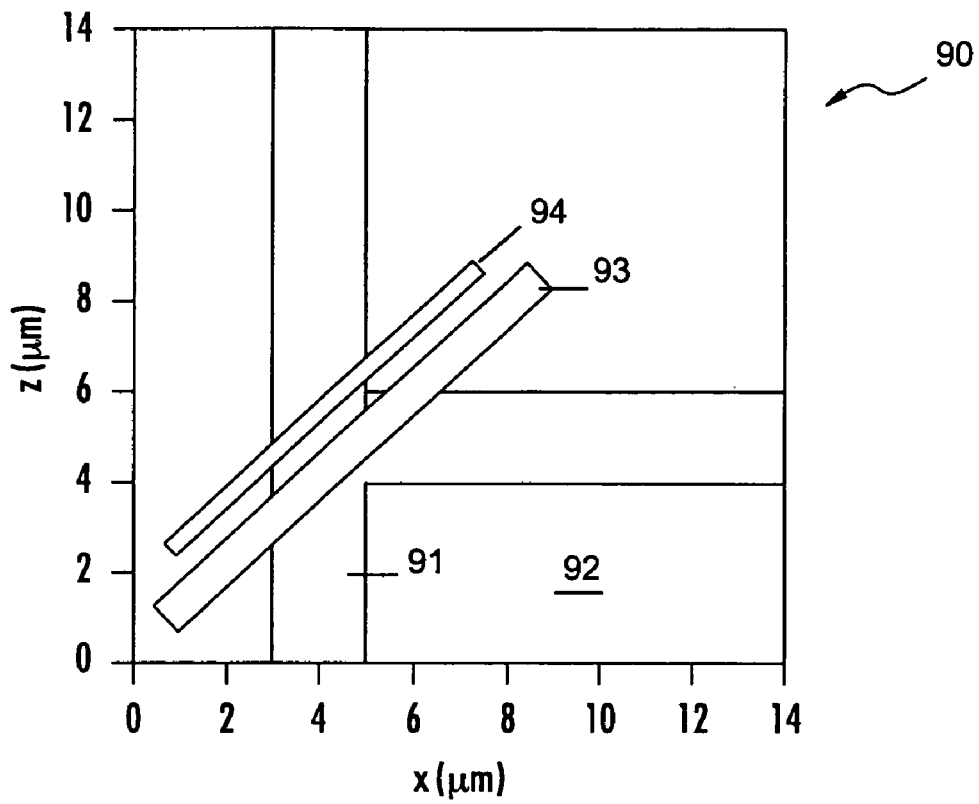
Figure 9:
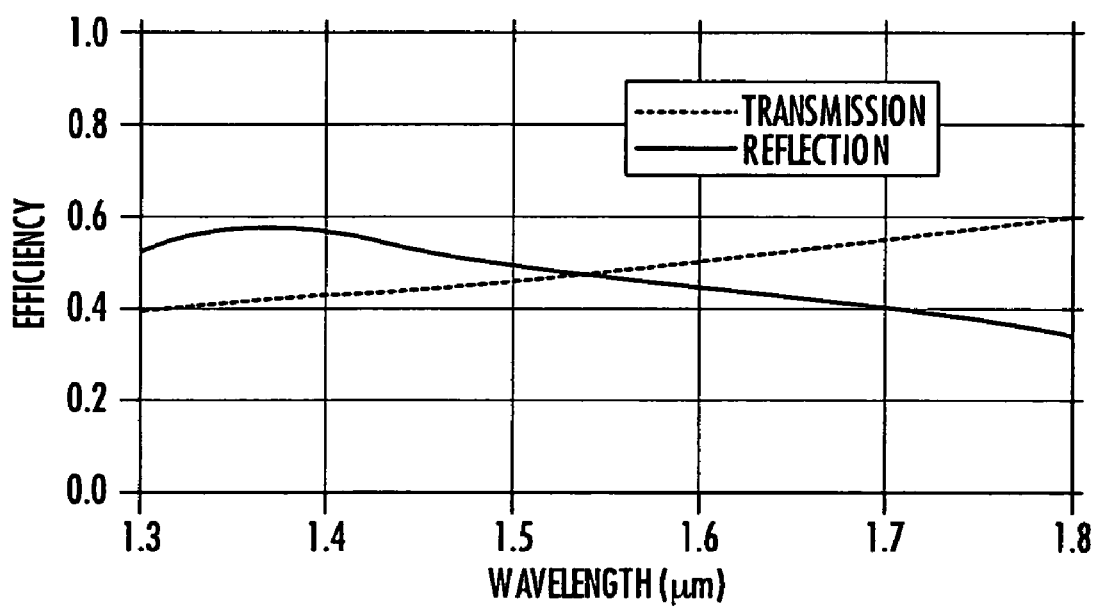
Figure 10:
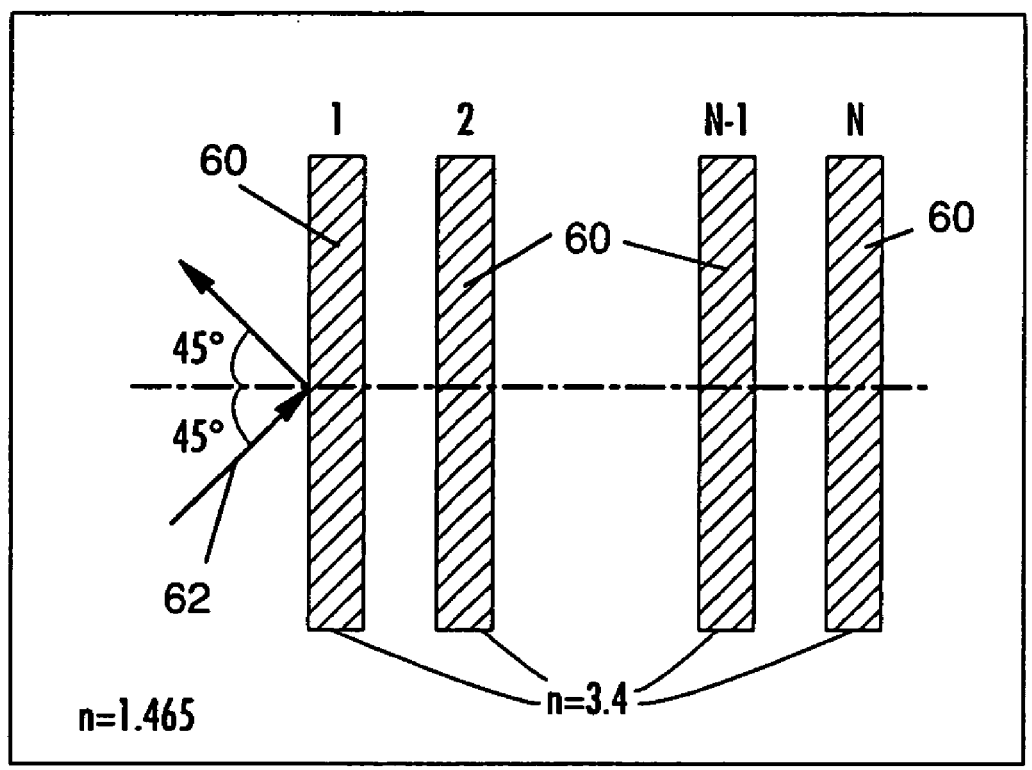
Figure 11:
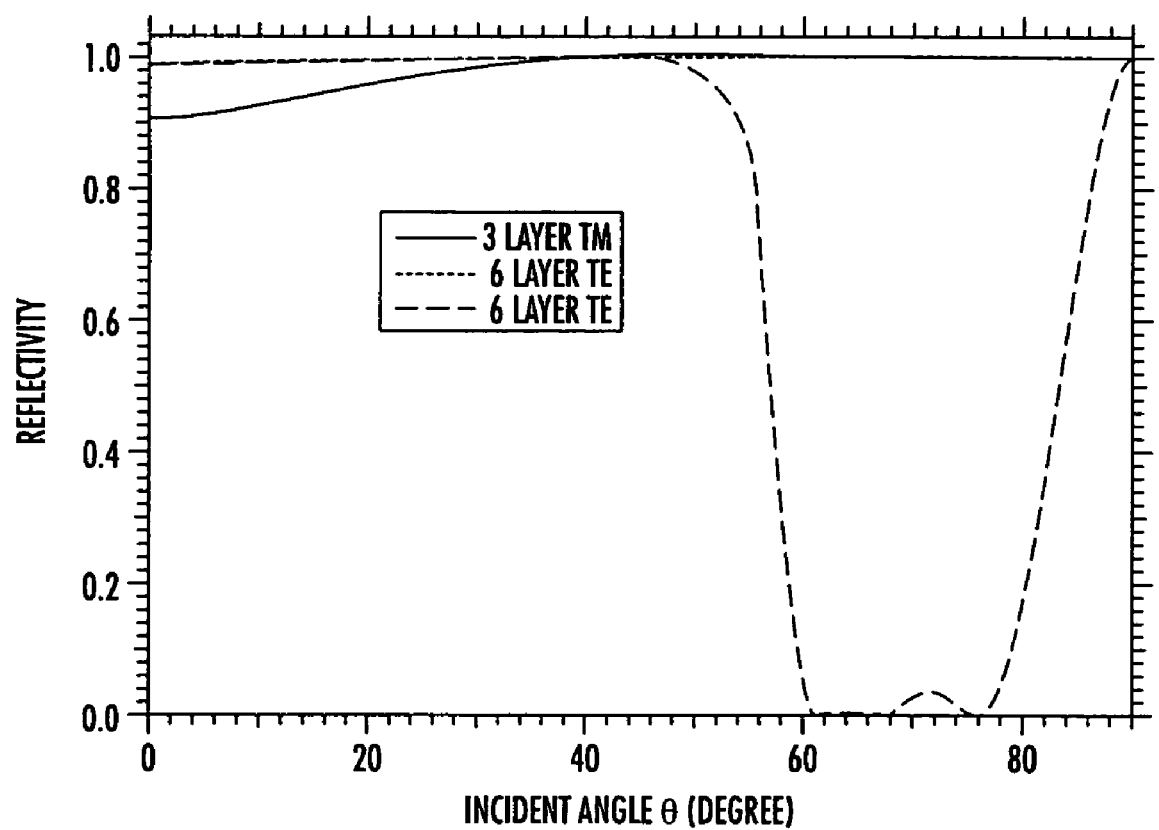
Figure 12A:
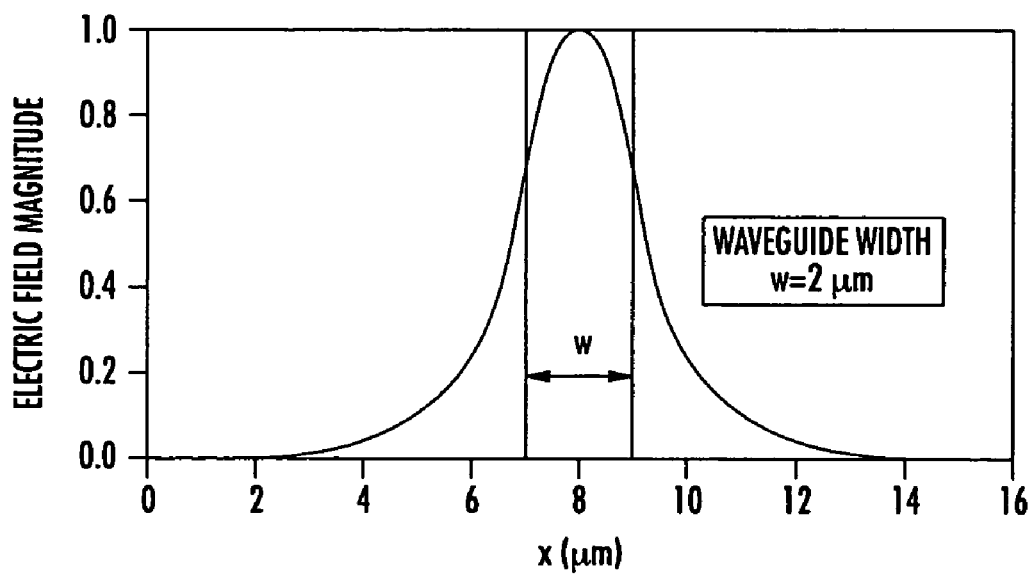
Figure 12B:
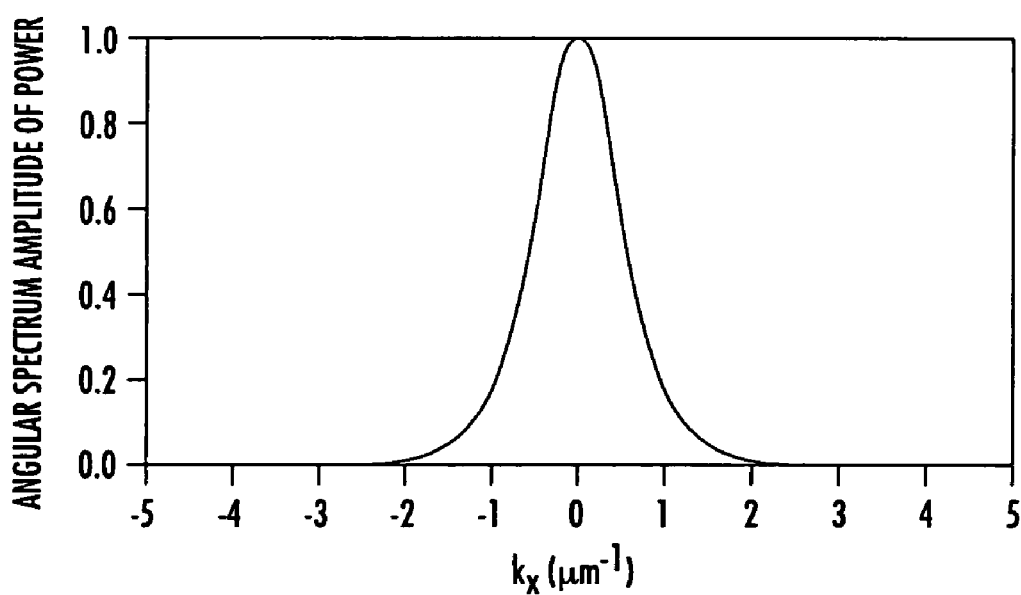
Figure 13:
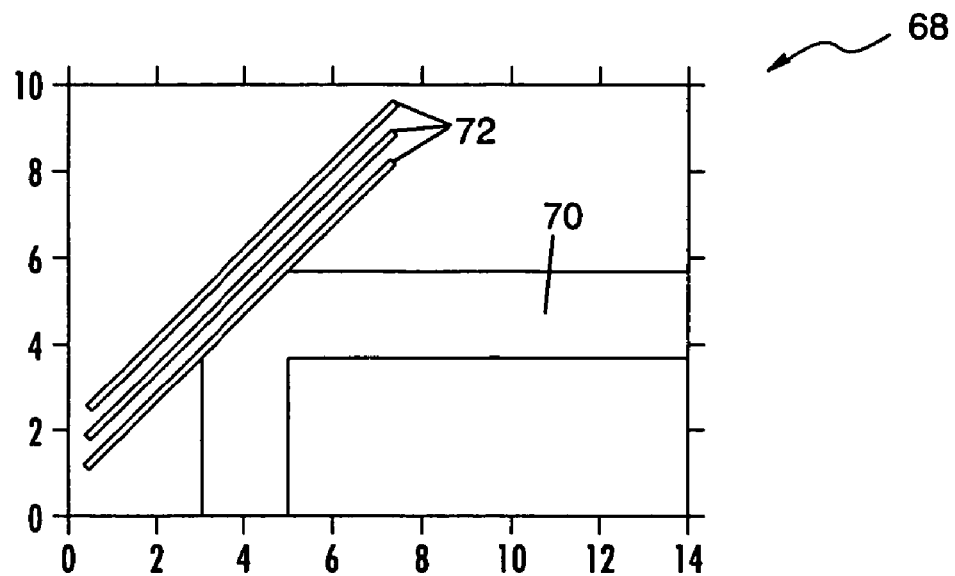
Figure 14:
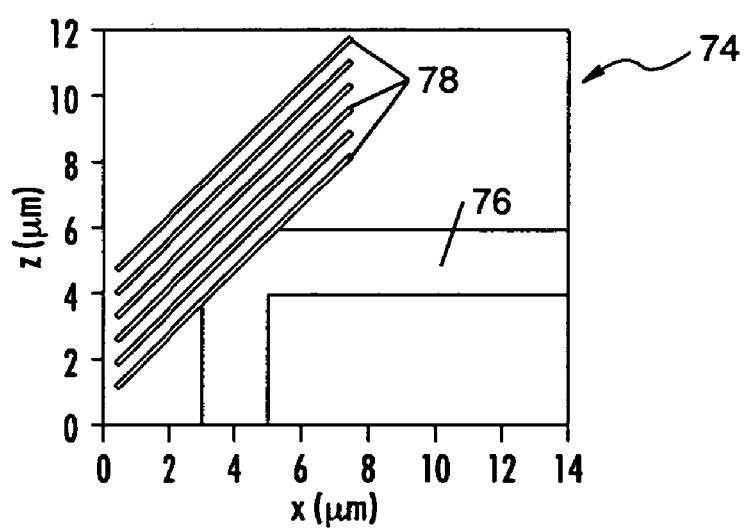
Figure 15:
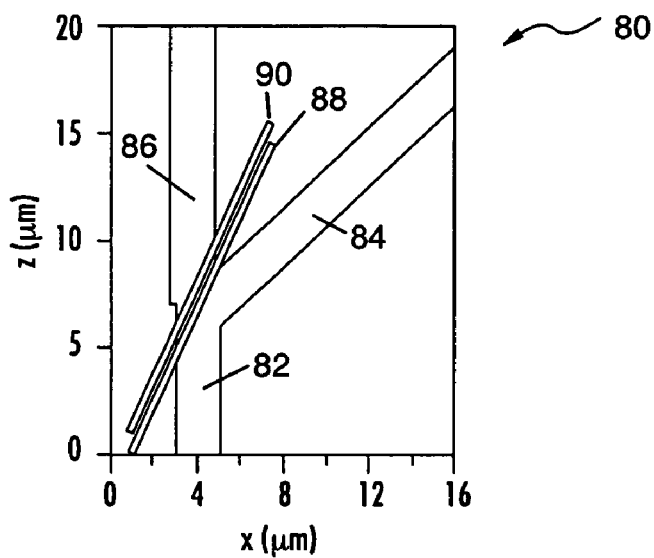
Figure 16:
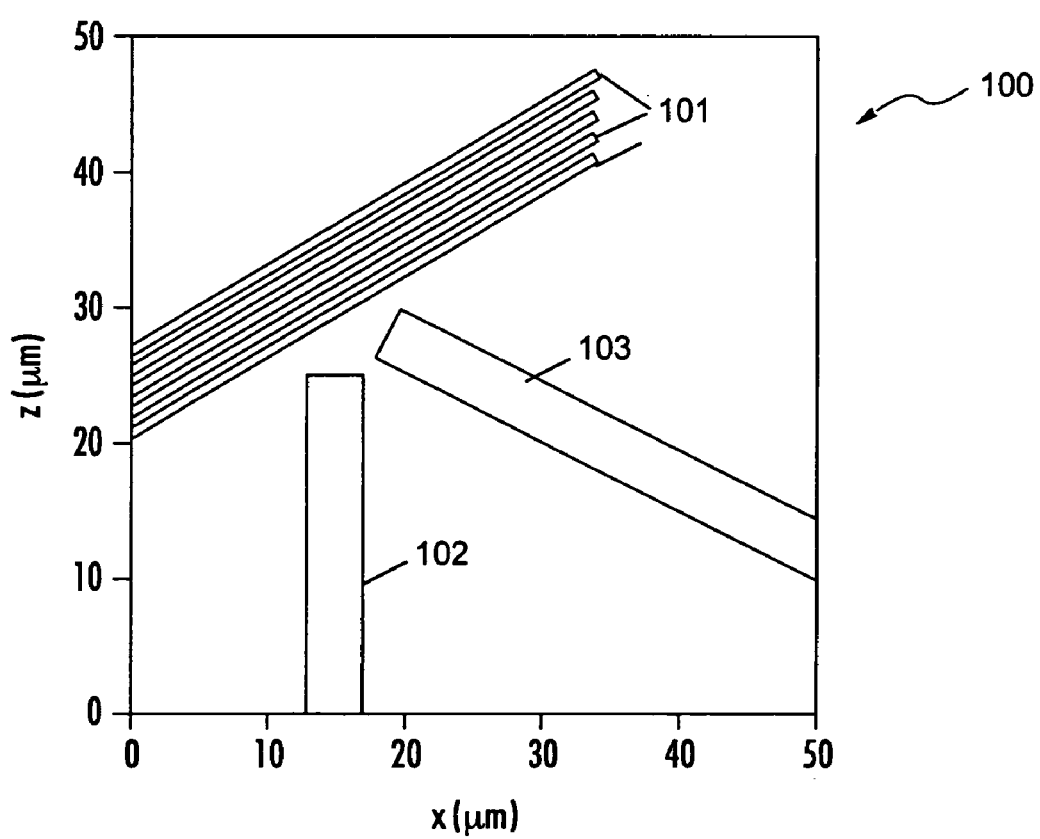
Figure 17A:
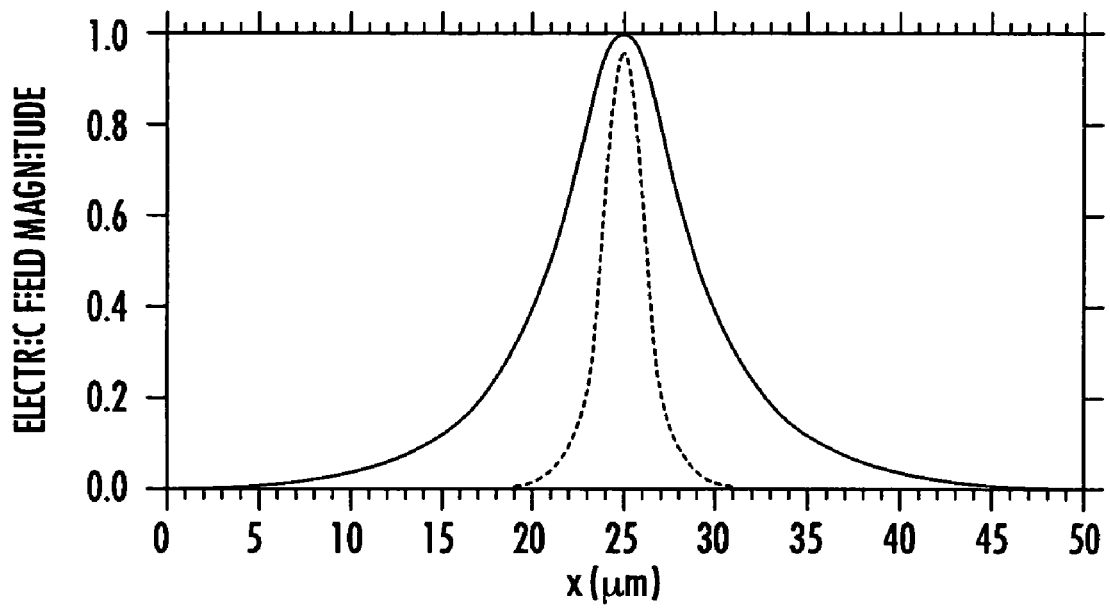
Figure 17B:
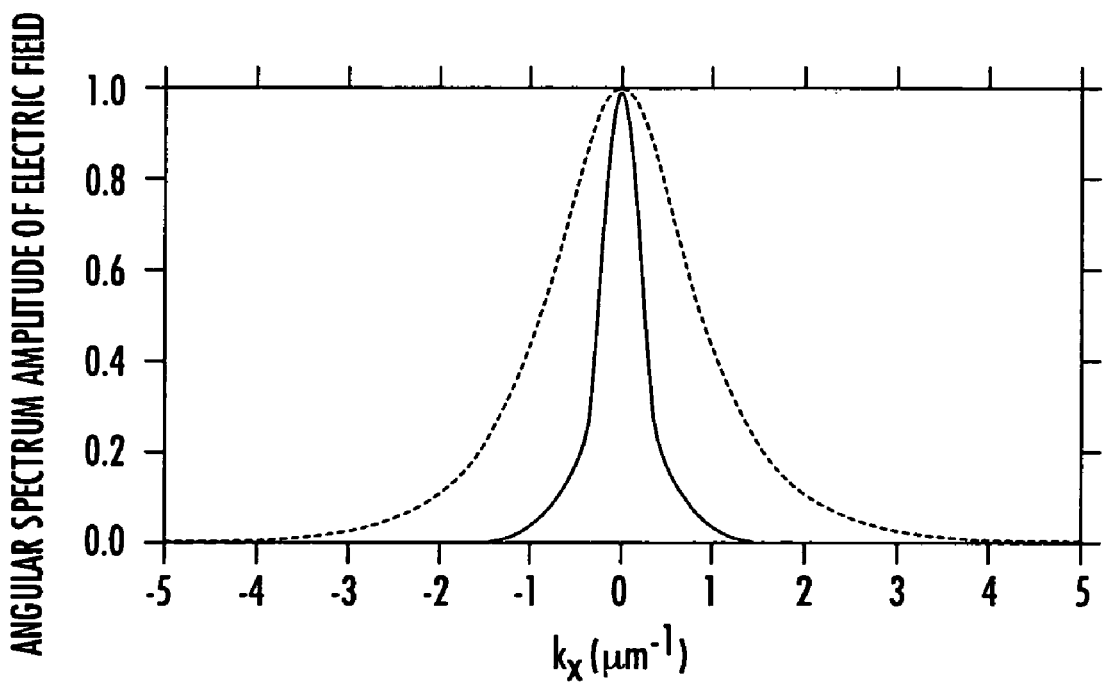
Figure 18:
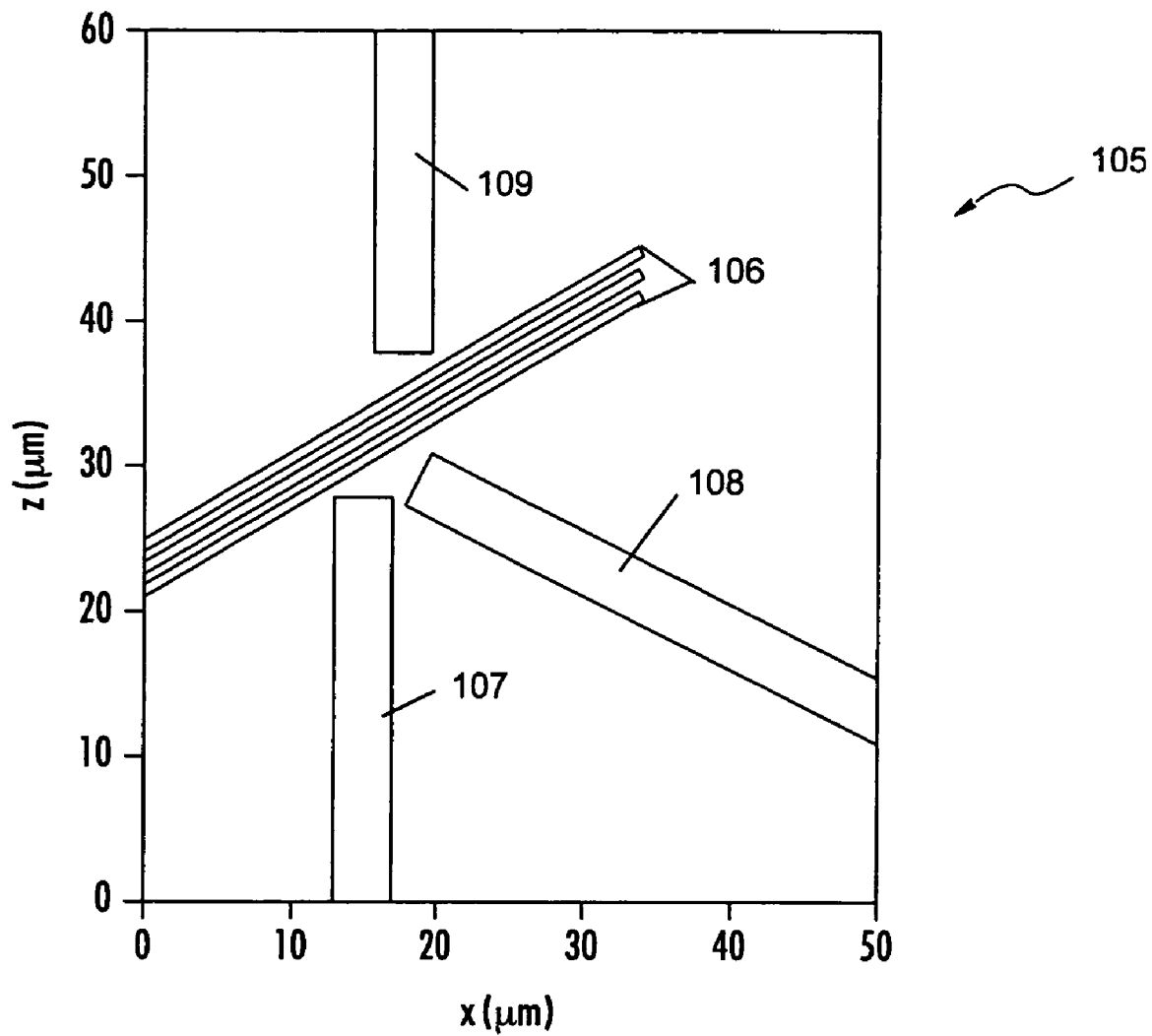
Figure 19:
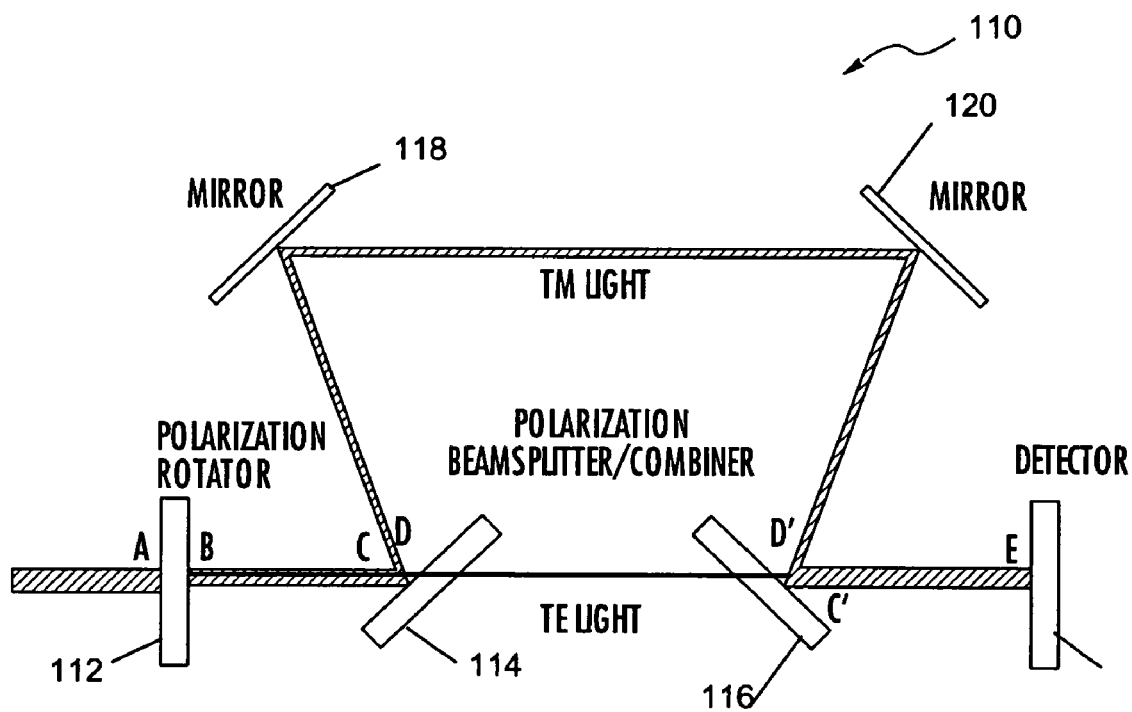
Figure 20:
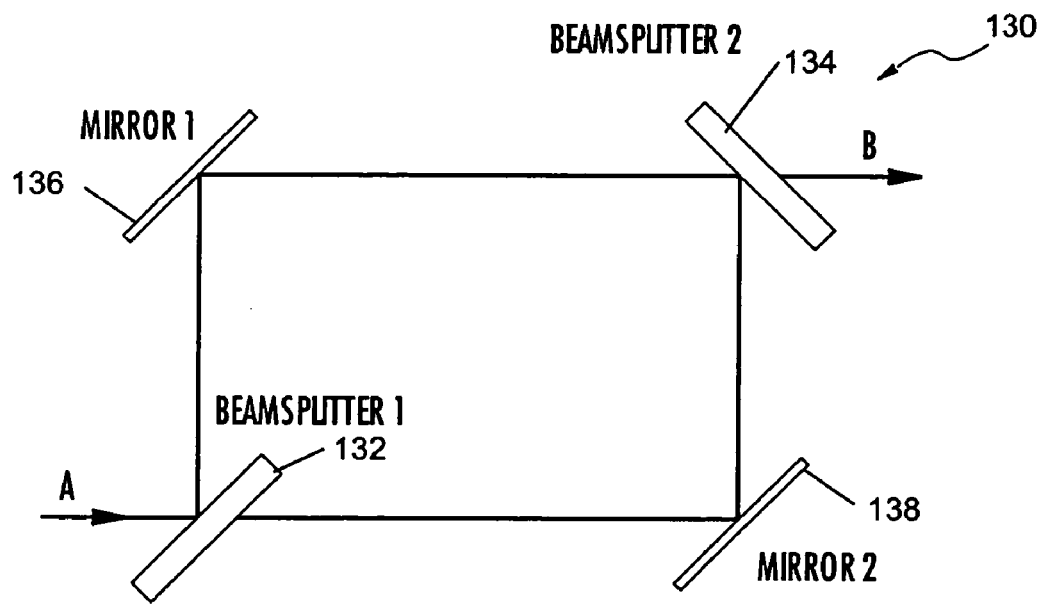

Having thus described the invention in general terms, reference will now be made to the accompanying drawings, which are not necessarily drawn to scale, and wherein:

FIG. 1 is a planar lightwave circuit waveguide bend having an air interface according to one embodiment of the invention;

FIG. 2 is a planar lightwave circuit waveguide bend having an air trench with multiple planar interfaces according to one embodiment of the invention;

FIG. 3 is a planar lightwave circuit waveguide bend having two air trenches with multiple planar interfaces according to one embodiment of the invention;

FIG. 4 is a planar lightwave circuit waveguide bend having three air trenches with multiple planar interfaces according to one embodiment of the invention;

FIG. 5 is a graph illustrating the bend efficiency with respect to wavelength of the structures illustrated in FIGS. 1–4;

FIG. 6 is a planar lightwave circuit beamsplitter having an air trench with multiple planar interfaces according to one embodiment of the invention;

FIG. 7 is a graph illustrating the reflection and transmission efficiency with respect to wavelength of the structure illustrated in FIG. 6;

FIG. 8 is a planar lightwave circuit beamsplitter having air trenches with multiple planar interfaces according to another embodiment of the invention;

FIG. 9 is a graph illustrating the reflection and transmission efficiency with respect to wavelength of the structure illustrated in FIG. 8;

FIG. 10 is an illustration of a Si Bragg mirror modeling the analysis of a planar lightwave circuit according to one embodiment of the invention;

FIG. 11 is a graph illustrating the reflectivity relative to lightwave incident angle of three layer and six layer Si trenches according to planar lightwave circuits of several embodiments of the invention;

FIGS. 12(a) and 12(b) are graphs illustrating electric field magnitude and angular spectrum power amplitude of the fundamental mode of a planar lightwave circuit waveguide according to one embodiment of the invention;

FIG. 13 is a planar lightwave circuit waveguide bend having three Bragg spaced Si trenches with multiple planar interfaces according to one embodiment of the invention;

FIG. 14 is a planar lightwave circuit waveguide bend having six Bragg spaced Si trenches with multiple planar interfaces according to one embodiment of the invention;

FIG. 15 is a planar lightwave circuit polarization beamsplitter having two Bragg spaced Si trenches with multiple planar interfaces according to one embodiment of the invention;

FIG. 16 is a planar lightwave circuit waveguide bend having Bragg spaced air trenches according to one embodiment of the present invention;

FIGS. 17(a) and 17(b) are graphs illustrating electric field magnitude and angular spectrum power amplitude comparisons of the fundamental modes of waveguides according to different embodiments of the invention;

FIG. 18 is a planar lightwave circuit waveguide beamsplitter having Bragg spaced air trenches according to one embodiment of the present invention;

FIG. 19 is a schematic of a waveguide depolarizer incorporating waveguide bend mirrors and polarization beamsplitter embodiments of the invention; and FIG. 20 is a schematic of a Mach-Zender interferometer incorporating waveguide bend mirrors and beamsplitter embodiments of the invention.

DETAILED DESCRIPTION OF THE INVENTION

The inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The apparatuses of the invention are based on multiple planar interfaces as a result of etched trenches. In this regard, embodiments are described in conjunction with etched air trenches in a planar lightwave circuit and etched air trenches that are filled with high refractive index silicon. Other embodiments will be recognized by one of ordinary skill in the art from the description herein, and such planar interfaces may be comprised of other materials having refractive indices and refractive index contrasts that permit a planar interface to achieve the electromagnetic properties described herein.

The embodiments described herein were developed by determining the electromagnetic properties of lightwaves throughout the device and optimizing those desired electromagnetic properties for transmission efficiency to achieve high reflection or desired ratio of transmission and reflection. One such algorithm to determine properties and optimization is a combination of micro-genetic algorithm (μGA) and a 2-D finite difference time domain (FDTD) method as described in Jiang and Nordin, "A Rigorous Unidirectional Method for Designing Finite Aperture Diffractive Optical Elements," Optics Express Vol. 7, 237–242 (2000), which is hereby incorporated by reference. Other methods and algorithms may be used to design high efficiency waveguide bends with multiple planar interfaces developed from etched trenches, as described herein, and these algorithms, such as simulated annealing, are known to those of ordinary skill in the art and may be substituted without departing form the spirit or scope of the invention. Some of the designs require optimization of the geometries of these multiple planar interfaces to result in higher efficiency waveguide bends.

Etched Air Trench

A planar lightwave circuit having multiple planar interfaces formed by etched trenches permits improved performance compared to a single air interface by reflecting optical field components in the waveguide mode's angular spectrum that do not undergo TIR. As used herein, planar interface refers to the plane of intersection of the two materials upon which the lightwave is incident. As described below, multiple planar interfaces of one embodiment resulted in an optical bend efficiency of 97.2% for a 90° bend compared to 78.4% for a single interface.

FIG. 1 illustrates a planar lightwave circuit waveguide 10 having a 90° bend formed with a single air interface 12 oriented at 45° to the input and output sections of the waveguide. The core 14 and clad 16 refractive indices are 1.500 and 1.465, respectively, and the waveguide core 14 width is 2 μm. For light with a free space wavelength, $\lambda_o$ of 1.55 μm, the waveguide supports a single transverse mode. For example, a Yi cell is $\lambda_o/80$ and the source input into waveguide is the fundamental mode of the waveguide. A transverse magnetic mode (TM) polarized light convention having an electric field normal to the plane of the figure is used to describe the properties herein.

A planar lightwave circuit waveguide having a 90° bend like FIG. 1 was analyzed to determine the electromagnetic properties of this structure. In such structures, most of the light is reflected by the air interface 12 through total internal reflection into the output of the waveguide. The bend efficiency, which is the ratio of the optical power in the output waveguide (calculated with the Poynting vector) to the incident optical power, was 78.4%. Some of the light is transmitted through the air interface, which reduces the bend efficiency.

The efficiency is understood by analyzing the angular spectrum of the guided mode. The mode profile and its angular spectrum are shown and described later in FIGS. 12(a)–(b). The $k_x=0$ plane wave component of the angular spectrum corresponds to an incidence angle of 45 degrees at the air interface. For the waveguide mode effective index, which is 1.485, the critical angle for TIR is 42.3°. Note that each plane wave component actually experiences a slightly different effective index so the critical angle for each is marginally different. Some fraction of the angular spectrum plane wave components are incident on the air interface at angles less than the critical angle, hence some portion of these plane wave components are transmitted through the interface.

To verify the analysis, a planar lightwave circuit (not shown) having an 80° bend was similarly analyzed. In that case the $k_x=0$ plane wave component is incident at an angle of 50° on the air interface. Fewer plane wave components were incident at less than the critical angle and thus are totally internally reflected so that the bend efficiency, 93.4%, is greater compared to the 90° bend. Likewise, the situation was improved when a planar lightwave circuit (not shown) has a bend angle decreased further to 60° (i.e., the incidence angle for the $k_x=0$ component is increased to 60°). In this case the bend efficiency is 99.2%.

The planar lightwave circuits of the invention improve the efficiency of 90° bends by employing multiple planar interfaces formed from air trenches in which the first air interface reflects much of the incident energy through TIR and the other interfaces reflect some of the energy transmitted through the interfaces. The planar interfaces must operate over a range of angular spectrum plane wave components, and moreover, the planar interfaces must compensate for frustrated TIR, which occurs due to the finite trench thickness.

Referring to FIG. 2, one embodiment of a planar lightwave circuit waveguide 18 comprises a waveguide 20 having asymmetrically spaced planar interfaces 24, 22 disposed in a bend and formed from an air trench 26 having parallel front and back surfaces defining the planar interfaces to the lightwave. The air trench may be formed by etching a void in the substrate of the planar lightwave circuit. The planar interface dimensions can be determined and analyzed for highest efficiency using an algorithm for determining the electromagnetic proprieties, such as the μGA algorithm described above. In this regard, the analysis yields the portion of the angular spectrum that does not undergo TIR and the portion that does undergo TIR. The parameters varied in optimization of the bend efficiency are the individual trench length and thickness, the separation between the trenches, and the overall position of the trench structure relative to the waveguide.

Multiple asymmetric planar interfaces for three embodiments of planar lightwave circuits are illustrated in FIGS. 2–4, and trench parameters and resultant bend efficiencies are given in Table 1, derived from optimization of the above parameters.

TABLE 1

Geometry and performance of air-trench 90° bends.

| Structure | Trench Dimensions (μm) | Trench Separation (μm) | Bending Efficiency (at x = 13.8 μm) |
|---|---|---|---|
| 1 Layer | 11.10 × 1.28 | — | 85.7% |
| 2 Layers | 10.35 × 0.90 | 0.44 | 94.8% |
| | 6.95 × 0.81 | | |
| 3 Layers | 10.05 × 1.05 | 0.44 | 97.2% |
| | 9.42 × 0.52 | 0.38 | |
| | 8.70 × 0.70 | | |

In the case of a single asymmetric air trench 26 (i.e. two planar interfaces 22, 24, the front face and the back face of the air trench), FIG. 2, the maximum bend efficiency was 85.7%, which is substantially greater than the result for a single planar interface. A fraction of the incident light is still transmitted through the 1.28 μm thick air trench 26. The addition of the second air interface 24 increases the reflection of angular spectrum plane wave components that do not undergo TIR, but at the cost of permitting frustrated TIR to occur for the other plane wave components. As a result of optimizing the trench parameters for maximum reflection, the former effect more than compensates for the latter.

Referring to FIG. 3, another embodiment of a planar lightwave circuit waveguide 27 includes two asymmetric air trenches 28, 30 (and therefore two additional planar interfaces) and further reduces the amount of light that leaks through the structure such that the bend efficiency is increased to 94.8%. Note that in this case the air trenches have comparable thicknesses (0.81 μm compared to 0.90 μm). Another embodiment of a planar lightwave circuit 36 having three air trenches 38, 40, 42, shown in FIG. 4, increases the bend efficiency to 97.2%. In this case the thicknesses of the air trenches 38, 40, 42 are significantly different (1.05 μm, 0.52 μm, and 0.70 μm, respectively). In all of the above cases an optimization algorithm, such as the μGA, described above, will aid one of ordinary skill in the art to optimize the solution of the trench parameters by analyzing the electromagnetic properties of the structure.

An additional feature of multiple air trench 90° bends is illustrated in FIG. 5 in which the bend efficiency is shown as a function of the wavelength. In each case the bend efficiency is only weakly dependent on wavelength, which is a result that permits relatively uniform efficiency of the structure across the spectrum. For example, the bend efficiency for the 3-layer air trench is greater than 95% over the wavelength range 1.43 μm to 1.61 μm.

As shown in FIG. 6, a planar lightwave circuit waveguide beamsplitter 50 may comprise a waveguide 54 split into two directions 56, 58 and at least one air trench 52 that is designed to work by frustrated TIR. In this example, a trench 52 is 10.5 μm long and 0.39 μm thick shifted by 0.38 μm along the +x-axis. This embodiment transmits 48.8% of the incident light in the first direction of the output waveguide 58 and reflects 49.7% in the first direction of the output waveguide 56. The resulting efficiency is then 98.5%. A positional shift of the trench permits the design to account for the Goos-Hanchen shift of the reflected light. The spectral dependence of the reflected and transmitted light is shown in FIG. 7, which demonstrates the relative uniformity across the spectrum. While the air-trench beamsplitter exhibits somewhat greater wavelength sensitivity than air-trench 90° bends, the efficiency for reflected and transmitted light stays within 40%–60% over the entire wavelength range of 1.3 μm to 1.8 μm shown in the figure.

FIG. 8 illustrates a planar lightwave circuit 90 comprising a two-layer air-trench beamsplitter for TE polarized light from the manual adjustment and analysis. The single air-trench embodiment of a beamsplitter was developed considering TM light (electric field out of the plane). For TE polarized light (electric field in the plane), an embodiment of a planar lightwave circuit 90 including two trenches provide balance and even ratios of reflected and transmitted light between TE and TM modes. The waveguide core, 91 clad 92, and trench 93, 94 refractive indices are the same as described above. The thickness of the trench and the separation between the trenches may be manually optimized. In this embodiment, the results yielded first trench 93 dimensions of 11×0.7 μm, the second trench 94 dimensions of 9×0.32 μm, and a separation in their normal direction of 0.72 μm. Analyzed for a pulse of Δλ=0.36 μm the spectrum response is illustrated in FIG. 9.

An Si Filled Trench

The multiple planar interfaces of an air-trench, as described above, are asymmetric, meaning that it is not a periodic structure, and each layer thickness has been optimized with respect to achieving high bend efficiency or beamsplitting. The structure is nonperiodic because the air trenches work in two forms: total internal reflection (TIR) for the components having incident angles greater than critical angles, and partial reflection for the rest based on waveguide plane wave expansion. Each of the layer thicknesses affect both parts but no theoretical thickness is available, and therefore an optimization algorithm, such as the μGA, is used to optimize the structure to achieve maximum reflection. However, that structure is very similar to a Bragg stack, which is by definition a periodic structure. Periodic planar interfaces (Bragg mirror) can then be analyzed as a mirror for the same low-index-contrast waveguide 90° bends using a similar analysis as above. In these embodiments of a planar lightwave circuit (illustrated in more detail below), the air trench is filled with high-index material such as silicon (n=3.4).

A high degree of reflection can be achieved by adding more planar interfaces with some index contrast between the neighboring layers. However, the Bragg mirror application requires analysis of waveguide mode incidence, which, by waveguide mode plane-wave expansion, can be decomposed into infinite numbers of plane waves. As described below, the three-layer silicon Bragg mirror can give bend efficiency 98.6% for TM light incidence (electric field out of the plane), while six-layer mirror gives only 91.2% for TE light (in the plane). To improve the bend efficiency for TE light, an optimization algorithm, such as the μGA algorithm, may be used to optimize each thickness of a six-layer Bragg mirror and the bend efficiency improves to 94.6% for TE light while still being highly efficient for TM light.

The Bragg mirror's performance as waveguide bends is related to its incident angle tolerance with a plane-wave incidence. FIG. 10 illustrates a model for the fundamental analysis of n-Si trenches 60 of a Bragg mirror for a 90° waveguide bend (not shown) where the plane wave 62 is incident angle is 45°. The material refractive index of the Bragg layers are n=3.4 and n=1.465, and the latter is the cladding material of the waveguide as described in the waveguide embodiment above. To satisfy a constructive reflection, the phase difference δ between the reflected beams from the neighboring interfaces should be an odd multiple of π, which is, $$\delta = \frac{4\pi}{\lambda_0} nt\cos\theta = (2m-1)\pi \quad m = 1, 2, 3, \ldots \quad (1)$$

where $\lambda_0$ is the wavelength in vacuum, here $\lambda_0$=1.55 μm; n is the refractive index, t is the thickness, and θ is the propagation angle of a specific layer. In this embodiment n=1.465 (waveguide) or 3.4 (Si trench) and its corresponding θ angle is 45° or 17.74°. The basic layer thickness t for each layer can be obtained by setting m=1, and then t=0.374 μm for n=1.465 or t=0.12 μm or n=3.4. For a high contrast constructive reflection, three Si layers have reflectivity sufficient to obtain 99% bend efficiency for TM polarization, and six layers are sufficient to obtain 99% efficiency for TE polarization (the number of layers refers to the number of silicon trenches, thus planar interfaces are double the number of trenches). The power reflectivity for different structures with both TM and TE polarization cases are given in Table 2.

TABLE 2

Power reflectivity of Bragg mirror for plane-wave 45° incidence

| Bragg configuration (Number of Si layer) | R (TM) | R (TE) |
| --- | --- | --- |
| Single interface | 26.5% | 7.0% |
| 1 layer | 66.3% | 24.5% |
| 2 layer | 95.8% | 63.2% |
| 3 layer | 99.6% | 85.7% |
| 4 layer | 100% | 94.9% |
| 5 layer | 100% | 99.0% |
| 6 layer | 100% | 99.4% |

The analysis also showed that the Bragg mirrors have a flat reflectivity curve as a function of incident angle as shown in FIG. 11 for both three-layer (TM) and six-layer (TM and TE). FIG. 11 illustrates that the incident angle can be 28° to 90° to have reflectivity above 98% for 3-layer mirror, while 6-layer mirror is flat and has reflectivity above 99% through the incidence range from 0 to 90°. However, due to the Brewster phenomena for TE light, here Brewster angle is around 66.7°, the six-layer mirror does not have as long and flat range for TE light compared with TM light. The reflection curve is flat and has high efficiency above 99% from 0 to 50° while it is close to 0 in range of the Brewster angle, from 60° to 78°. This Brewster phenomenon can be utilized to construct a waveguide polarization beamsplitter as described below.

A planar lightwave circuit waveguide of one embodiment may have a core and cladding refractive indices 1.5 and 1.465, respectively, and width 2 μm, such as described above in the air trench embodiment. The normalized electric field profile of the fundamental mode of TM polarization is given in FIG. 12(a) and FIG. 12(b) is the normalized spatial power angular spectrum, which is the squared magnitude of the fast fourier transform (FFT) of FIG. 12(a). As a result, the waveguide mode can be decomposed to infinite numbers of plane waves that propagate in slightly different mediums and in different directions. Specifically, most of the power is concentrated within $k_x=\pm 2$ μm$^{-1}$, which corresponds to an incident angle range of about ±17° around the incident angle for $k_x$=0, which in the embodiment the incident angle is 45°. Based on the explanation of incident angle range of FIG. 11, if the Bragg mirror has an incident angle tolerance greater than the waveguide mode incident range ±17°, then all the decomposed spatial components from the waveguide would go through the same high reflectivity and there is not much difference between a waveguide mode incidence and a plane-wave incidence. For the 3-layer Bragg mirror with TM light incidence, FIG. 9 shows that in the range of 28° to 90° incidence, the reflectivity is above 98%, and therefore the 3-layer Bragg mirror should still have high reflectivity (bend efficiency) for the described waveguide. Similarly, the 6-layer Bragg mirror for TM light has a range of 0 to 90° to have reflectivity above 99%, and operates well with the described waveguide. The 6-layer Bragg mirror for TE light has a narrower range of reflectivity above 99%, incidence of 0 to 50°. Spatial components from the waveguide having an incident angle greater than 50° will have low reflectivity; angles of incidence near the Brewster angle will be practically transparent. So the 6-layer Bragg mirror with TE light is not expected to have high reflectivity for the waveguide mode compared with plane-wave case.

Based upon the above knowledge of the FIG. 10 model and FIGS. 11 and 12 analysis, FIG. 13 illustrates one embodiment of a planar lightwave circuit waveguide 68 having a 90° waveguide bend (45° incidence, TM) for a 3-layer Si trench 72 Bragg mirror as listed in Table I, having a periodic thickness, 0.12 µm for n=3.4 and 0.374 µm for n=1.465. The waveguide mode bend efficiency of the structure in FIG. 5 is 98.6%, which matches the 99.6% bend efficiency for the plane-wave incidence.

FIG. 14 illustrates another embodiment of a planar lightwave circuit 74 having a 6-layer Si trench 78 Bragg mirror, and it has a reflectivity 91.2% for the waveguide mode, but the reflectivity is 99.4% for the plane-wave TE incidence. The same geometry for TM light has a reflectivity 99.4%, which matches the 100% for 6-layer TM light.

In order to improve the performance of the 6-layer Bragg mirror for TE polarization, an optimization algorithm, such as the µGA optimization algorithm, may be used to vary the parameters in an asymmetrical manner, thereby producing a quasi-Bragg mirror structure. The thickness of all Si layers and the spacing distances between them are then variable. The unequal thickness balances the reflection for each plane wave components of the waveguide mode to obtain a higher reflection. As a result the efficiency can be improved for one 6-layer embodiment to 94.6% for TE polarization, while the bend efficiency for TM polarization remains relatively unchanged at 99.1%.

The results above also demonstrate that a polarization beamsplitter is possible in the Si trench case, as illustrated by the Brewster phenomena in FIG. 11. Referring to FIG. 15, a planar lightwave circuit beamsplitter 80 may comprise a 2-layer Si trench 88 Bragg mirror and first and second output waveguides 84, 86. The trenches 88 may be varied in orientation (incidence angle) to achieve a polarization beamsplitter, with the incidence angle being approximately the Brewster angle incidence. The first output waveguide 84 therefore being the reflection, and the second output waveguide 86 being the transmission. Using the same waveguide as described above, the Brewster angle is $\theta_B=66.7°$. Theoretical calculation for the 2-layer Bragg mirror with a plane-wave Brewster angle incidence is 99.5% reflection for TM while 0 for TE light. For waveguide mode incidence, however, the transmission for TE polarization is only 90.1% and the reflection for TM is 97.3%. The waveguide mode case is different because a fraction of the light does not have an incidence close to the Brewster angle (as noted above, the incidence will be different for various plane wave components) so there is some reflection. The results suggest that for a polarization beamsplitter with a narrower angular power spectrum, the results may improve because all the spatial components of the mode will have incident angles closer to the Brewster angle.

Air-Trench Bragg Mirror and Polarization Beamsplitter

Referring now to FIG. 16, one embodiment of the invention includes a planar lightwave circuit 100 comprising an air trench Bragg mirror with 5 air trenches 101, input 102 and output 103 waveguides. The principles of the Si Bragg mirror above apply to the design of the air trench Bragg mirror. The waveguide illustrated in FIG. 16 was designed to 4 µm width, core and cladding indices 1.6351 and 1.6330, and $\Delta n=0.13\%$. As demonstrated in FIGS. 17(a) and (b), this embodiment has a lower contrast than the previously described waveguide embodiments, the dashed line representing the previously described waveguide and the solid lines representing the waveguide used in this embodiment. The transverse electric field, FIG. 17(a), of the waveguide employed in this embodiment is wider than the previously described waveguide while its FFT, FIG. 17(b) is narrower and closer to a plane wave. In the first order approximation, then, the Bragg mirror is considered based on a plane wave incidence and a special incident angle at the Brewster angle, $\theta_B=31.48°$ for designing both a Bragg mirror and a polarization beamsplitter. According to another embodiment of the invention, a planar lightwave circuit 105 comprising a polarization beam splitter, FIG. 18, was considered with the same design parameters as the Bragg mirror, including design of the waveguide, core and cladding indices. When designing the polarization beamsplitter with an air trench Bragg structure 106, the transmission path to one output waveguide 109 and the reflection path output to a second waveguide 108 are both considered. When propagating to the beamsplitter from the input waveguide 108 at the Brewster angle, most of the TE power would go transmit through without reflection while the most TM light is reflected. Additional trenches allow lower TE light transmission and higher TM reflection. In considering this effect, a three-layer air-trench 106 was selected for a polarization beamsplitter yielding TM reflection of 97.8% and TE transmission of 97.7%.

It will be noted by one of ordinary skill in the art that planar lightwave circuits of the inventions herein are generally fabricated using standard semiconductor manufacturing techniques. Therefore, the fabrication of the planar lightwave circuit is accomplished through standard monolithic semiconductor manufacturing techniques including chemical vapor phase deposition techniques, physical vapor deposition or sputtering techniques, evaporation techniques, spin-on deposition techniques, photolithography, wet or dry etching techniques, etc. The specific fabrication technique is often chosen with respect to manufacturing equipment and materials used in the deposition. As such, the apparatus disclosed herein may be fabricated in conjunction with many techniques and materials, as will be recognized by one of ordinary skill in the art.

In summary, the planar lightwave circuits of the invention illustrate high efficiency waveguide bends and beamsplitters for low refractive index and low index contrast waveguides through the use of air interfaces and air trenches. In the case of a single air interface, the highest efficiencies are achieved for bend angles less than 90°. For multiple air trench 90° bends, optimized air trenches permit high efficiency waveguide bends. Also, single and multiple air trenches that operate through frustrated TIR can be used to form compact 90° beamsplitters.

In the Si trench embodiments illustrated above, a Bragg mirror or quasi-Bragg mirror forming multiple planar interfaces also permits waveguide bends in low-index-contrast waveguides. The 3-layer Bragg mirror is a high-efficiency 90° waveguide bend for TM polarization while an optimized 6-layer quasi-Bragg mirror improves the bend efficiency for TE light. The incident angle tolerance for a Bragg mirror with plane-wave incidence has direct impact on the performance of the waveguide application, and Bragg mirrors with large incident angle tolerance works well for this type of waveguide with index contrast about 2.3%. The results suggest that Bragg mirrors with narrow incident angle tolerance are expected to work well for lower-index-contrast waveguides having a narrower angular spectrum. Also, a 2-layer Bragg mirror waveguide polarization beamsplitter embodiment having a Brewster angle incidence should also perform better with lower-index-contrast waveguides having a narrower angular spectrum.

Waveguide Devices Based on Waveguide Bend Mirrors and Beamsplitters

The above embodiments may be employed in many planar lightwave circuit devices known to those of ordinary skill in the art. Advantageously, the invention permits reduced angles in and therefore reduced space consumption in these devices. One example is a waveguide depolarizer 110 for use in an Interferometric Fiber Optic Gyroscope (IFOG). IFOG typically employs a winding of polarization maintaining fiber, which is quite expensive. To avoid high cost, inexpensive single mode fiber can be used incorporating depolarizers before the fiber coil. If polarized light enters a single mode fiber coil, small variations in temperature, stress, and vibration, and other factors will cause random birefringence changes. As a result the polarization state varies randomly. Because of this random variation, the beam's intensity will vary and, at times, drop to zero. This phenomenon is called polarization fading. If the depolarizers are introduced, polarization fading can be avoided because random perturbations on the fiber will not cause a polarization change.

FIG. 19 illustrates a depolarizer 110 that transforms either completely or partially polarized light to a final unpolarized state. The light coming from other components of the Gyro system to the depolarizer 110 is assumed to be completely polarized (E field out of the plane), but quasi-monochromatic with $\Delta\lambda=35$ nm centered at $\lambda_0=1.31$ µm and coherent length $l_c=40$ µm. Two incoherent polarized beams with equal intensity and orthogonal polarization can be added together by their Stokes vectors and the result will be unpolarized light.

In this regard, the light is split equally, A by B, for their polarizations by a rotator 112, transmitting TE and TM light along a different path to an embodiment of a polarization beamsplitter 114 for splitting, C to D, along different length paths. The path of the TM light is reflected by embodiments of waveguide bend mirrors 118, 120, such as embodiments described above. The path difference should be larger than the source coherent length, so that TE and TM light becomes incoherent when being brought together again. Another polarization beamsplitter 116 combines each adding their Stokes to obtain depolarized light.

The inventions including waveguide bends and beamsplitters in combination also have useful applications in other common optical circuits, thus enabling smaller componentry in planar lightwave circuit for these often employed devices. Referring to FIG. 20, for example, a Mach-Zender interferometer 130 is often used to measure variations in refractive index of materials and could employ both a waveguide bend mirrors 136, 138, such as described above, to maintain a high efficiency of relfection and reduced size. Beamsplitter 132 and combiner 134 of the embodiments above may be employed in a planar lightwave circuit also enabling size reduction. As the light propagates through an optical waveguide, the light is split into two components by the beamsplitter and reflected through two optical paths of equal length. Prior to the output, a beamsplitter/combiner 134 of one of the above embodiments may be used to combine the paths at the output. Depending upon the differential index of refraction of the two paths, the combined signals exhibit a interference pattern as a result of phase differences.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A planar lightwave circuit, comprising
a waveguide for permitting lightwave propagation therethrough having a bend through which the waveguide direction is changed; and
a region disposed on the waveguide bend for reflecting at least a portion of the lightwave through the waveguide bend, wherein the region consists of a single set of air trenches without a cavity located therewithin, each air trench comprising a front planar interface and a back planar interface being parallel to other front and back interfaces, each air trench being disposed on the waveguide bend such that the front and back planar interfaces have an angle of incidence to a direction of the lightwave propagation reflecting at least a portion of the lightwave through the bend.

2. The planar lightwave circuit according to claim 1, wherein each air trench has a first refractive index and the waveguide has a second refractive index being greater than the first refractive index.

3. The planar lightwave circuit according to claim 2, wherein the front and back interfaces of each air trench are separated by a distance defined by an algorithm that maximizes the portion of the lightwave reflecting through the waveguide bend.

4. The planar lightwave circuit according to claim 1, wherein the bend angle is approximately 90°.

5. The planar lightwave circuit according to claim 1, wherein the front and back interfaces of each air trench are separated by a periodic distance.

6. A planar lightwave circuit, comprising
a waveguide for permitting lightwave propagation therethrough having a bend through which the waveguide direction is changed, the waveguide having a first refractive index; and
a region disposed on the waveguide bend for reflecting at least a portion of the lightwave through the waveguide bend, wherein the region consists of a single set of trenches without a cavity located therewithin and having a second refractive index, the second refractive index being different than the first refractive index, and each trench comprising a front planar interface and a back planar interface parallel to the front planar interface, each trench being disposed on the waveguide bend such that the front and back planar interfaces have an angle of incidence to a direction of the lightwave propagation reflecting at least a portion of the lightwave through the bend.

7. The planar lightwave circuit according to claim 6, wherein each trench is at least partially comprised of silicon.

8. The planar lightwave circuit according to claim 6, wherein each trench comprises an etched air void.

9. The planar lightwave circuit according to claim 6, wherein the second refractive index is greater than the first refractive index.

10. The planar lightwave circuit according to claim 6, wherein the bend angle is approximately 90°.

11. The planar lightwave circuit according to claim 6, wherein the front and back interfaces of each trench are separated by a periodic distance.

12. The planar lightwave circuit according to claim 11, wherein the distance between the interfaces is defined by an algorithm that maximizes the portion of the lightwave reflecting through the waveguide bend based on the reflection of the front and back interface.

13. A planar lightwave circuit beamsplitter comprising
a waveguide for permitting lightwave propagation therethrough having a split in first and second directions, the waveguide having a first refractive index; and
a region disposed on the waveguide split for reflecting a first portion of the lightwave in the first direction of the split and permitting transmission of a second portion of the lightwave in the second direction of the split, wherein the region consists of a single set of trenches without a cavity located therewithin and having a second refractive index, the first refractive index being different than the second refractive index, and each trench comprising a front planar interface and a back planar interface parallel to the front planar interface, each trench being disposed on the waveguide split such that the front and back planar interfaces have an angle of incidence to a direction of the lightwave propagation, the front and back interfaces reflecting the first portion of the lightwave in the first direction of the split and permitting transmission of the second portion of the lightwave in the second direction of the split.

14. The planar lightwave circuit beamsplitter according to claim 13, wherein the trench comprises an etched air void.

15. The planar lightwave circuit beamsplitter according to claim 13, wherein the first refractive index is greater than the second refractive index.

16. The planar lightwave circuit beamsplitter according to claim 13, wherein the first and second directions are separated by approximately 90°.

17. A planar lightwave circuit beamsplitter comprising
a waveguide for permitting lightwave propagation therethrough having a split in first and second directions, the waveguide having a first refractive index; and
a region disposed on the waveguide split for reflecting a first portion of the lightwave in the first direction of the split and permitting transmission of a second portion of the lightwave in the second direction of the split, wherein the region consists of a single set of trenches having a second refractive index, the first refractive index being different than the second refractive index, and each trench comprising a front planar interface and a back planar interface parallel to the front planar interface, each trench being disposed on the waveguide split such that the front and back planar interfaces have an angle of incidence to a direction of the lightwave propagation, the front and back interfaces reflecting the first portion of the lightwave in the first direction of the split and permitting transmission of the second portion of the lightwave in the second direction of the split, and wherein the front and back interfaces of the trench are separated by an asymmetric distance.

18. The planar lightwave circuit beamsplitter according to claim 17, wherein the asymmetric distance between the interfaces is defined by an algorithm that optimizes the portion of the lightwave reflecting in the first direction relative to the portion of lightwave transmission in the second direction.

19. A planar lightwave circuit polarization beamsplitter comprising,
a waveguide for permitting lightwave propagation therethrough having a split in first and second directions, the waveguide having a first refractive index; and
at least one trench having a second refractive index, the second refractive index being different than the first refractive index, and the trench comprising a front planar interface and a back planar interface parallel to the front planar interface, the trench being disposed on the waveguide split such that the front and back planar interfaces have an angle of incidence to a direction of the lightwave propagation at approximately a Brewster angle such that the front and back interfaces reflect a first portion of the lightwave in the first direction of the split and permit transmission of a second portion of the lightwave in the second direction of the split.

20. The planar lightwave circuit polarization beamsplitter according to claim 19, wherein the at least one trench is at least partially comprised of silicon.

21. The planar lightwave circuit polarization beamsplitter according to claim 19, wherein the trench comprises an etched air void.

22. The planar lightwave circuit polarization beamsplitter according to claim 19, wherein the second refractive index is greater than the first refractive index.

23. The planar lightwave circuit polarization beamsplitter according to claim 19, wherein the first and second directions are separated by approximately 90°.

24. The planar lightwave circuit polarization beamsplitter according to claim 19, wherein the front and back interfaces of the at least one trench are separated by a distance periodic with respect to a phase angle of the lightwave.

25. The planar lightwave circuit polarization beamsplitter according to claim 24, wherein the distance between the interfaces is defined by an algorithm that optimizes the portion of the lightwave reflecting in the first direction relative to the portion of the lightwave transmission in the second direction.

26. A planar lightwave circuit, comprising
a waveguide for permitting lightwave propagation therethrough having a bend through which the waveguide direction is changed; and
a plurality of air trenches, each air trench comprising a front planar interface and a back planar interface being parallel to other front and back interfaces, each air trench being disposed on the waveguide bend such that the front and back planar interfaces have an angle of incidence to a direction of the lightwave propagation reflecting at least a portion of the lightwave through the bend, the angle of incidence being greater than a critical angle for total internal reflection (TIR) of the lightwave.

* * * * *